United States Patent [19]
Kobayashi

[11] Patent Number: 5,081,742
[45] Date of Patent: Jan. 21, 1992

[54] HINGE DEVICE HAVING MECHANISM FOR STOPPING MOVABLE MEMBER AT OPEN POSITION

[75] Inventor: Takaichi Kobayashi, Itsukaichi, Japan

[73] Assignee: Kabushiki Kaisha Toshiba, Kawasaki, Japan

[21] Appl. No.: 542,119

[22] Filed: Jun. 22, 1990

[30] Foreign Application Priority Data

Jun. 23, 1989 [JP] Japan .................................. 1-162227

[51] Int. Cl.$^5$ .............................................. E05D 7/00
[52] U.S. Cl. .......................................... 16/337; 16/342
[58] Field of Search ................................. 16/337, 342

[56] References Cited

U.S. PATENT DOCUMENTS 1,734,005 10/1929 Chambers ............................ 16/337
4,018,104 4/1977 Bland et al. ......................... 16/342
4,571,456 2/1986 Paulsen et al. .
4,730,364 3/1988 Tat-Kee .............................. 16/337

FOREIGN PATENT DOCUMENTS 99111 6/1984 Japan .
280925 5/1952 Switzerland ......................... 16/342

Primary Examiner—Robert L. Spruill
Assistant Examiner—Carmine Cuda
Attorney, Agent, or Firm—Cushman, Darby & Cushman

[57] ABSTRACT

A hinge device comprising a shaft to be connected at one end to a first member, a bracket mounted on the shaft, for supporting a second member such that the second member rotates around said shaft, and wave washers held and compressed between said shaft and said support means. The wave washers generates a friction between said shaft and the second member when the first and second members are rotated relative to each other around said shaft, thus suppressing the rotation of the first and second members.

14 Claims, 10 Drawing Sheets

HINGE DEVICE HAVING MECHANISM FOR STOPPING MOVABLE MEMBER AT OPEN POSITION

BACKGROUND OF THE INVENTION

1. Field of the Invention

The present invention relates to a hinge device for use in a portable apparatus such as a lap-top or portable personal computer and more particularly to a hinge device having a mechanism for stopping a movable member of the apparatus at an open position, by virtue of the frictional force exerted by a spring member.

2. Description of the Related Art

U.S Pat. No. 4,571,456 discloses a portable personal computer which comprises a rectangular case, a keyboard attached to the case, and a display unit attached to the case by a hinge.

Connected by the hinge to the case, the display unit can rotate between a position (hereinafter referred to as "closed position") where it covers the keyboard and a position (hereinafter referred to as "opened position") where it stands upright at the rear of the keyboard. The hinge includes a mechanism which exerts a frictional force to stop the display unit at any position between the closed position and the open position.

A hinge having such a mechanism and designed to connect a display unit to the case of a personal computer is disclosed in Published Unexamined Japanese Patent Application No. 59-99111. This hinge comprises a shaft and a coil spring wound around the shaft. The shaft is fastened at one end to the display unit and at the other end to the case. As the display unit is rotated upward, the coil spring is wound more and more tightly around the shaft, whereby a frictional force is generated between the shaft and the coil spring. By virtue of this force, the display unit is held up at a position where the user takes his or her hand off the display unit, provided that the hinge shaft and the coil spring have a proper outside diameter and an appropriate inside diameter, respectively, and are set at correct positions. It requires much time and labor to make the shaft and the spring with sufficient precision and to set them in a correct positional relationship. consequently, the manufacturing cost of the hinge is inevitably high.

SUMMARY OF THE INVENTION

The object of the present invention is to provide a hinge device whose components need not be machined or positioned with high-precision, and which is therefore easy to manufacture.

According to the invention, there is provided a hinge device comprising: a shaft to be connected at one end to a first member; support means, mounted on the shaft, for supporting a second member such that the second member rotates around the shaft; and ring-shaped spring means held and compressed between the shaft and the support means, for generating a friction between said shaft and said support means when the first and second members are rotated relative to each other around the shaft, thereby to suppress the rotation of the first and second members.

The ring-shaped spring means can easily be incorporated in the hinge device when pushed into the gap between the shaft and the support means. Once incorporated, the ring-shaped spring means can exert a frictional force between the shaft and the support means. Unlike the coil spring used in the conventional hinge described above, the spring means need not be machined or positioned with high precision.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

Figure 1:
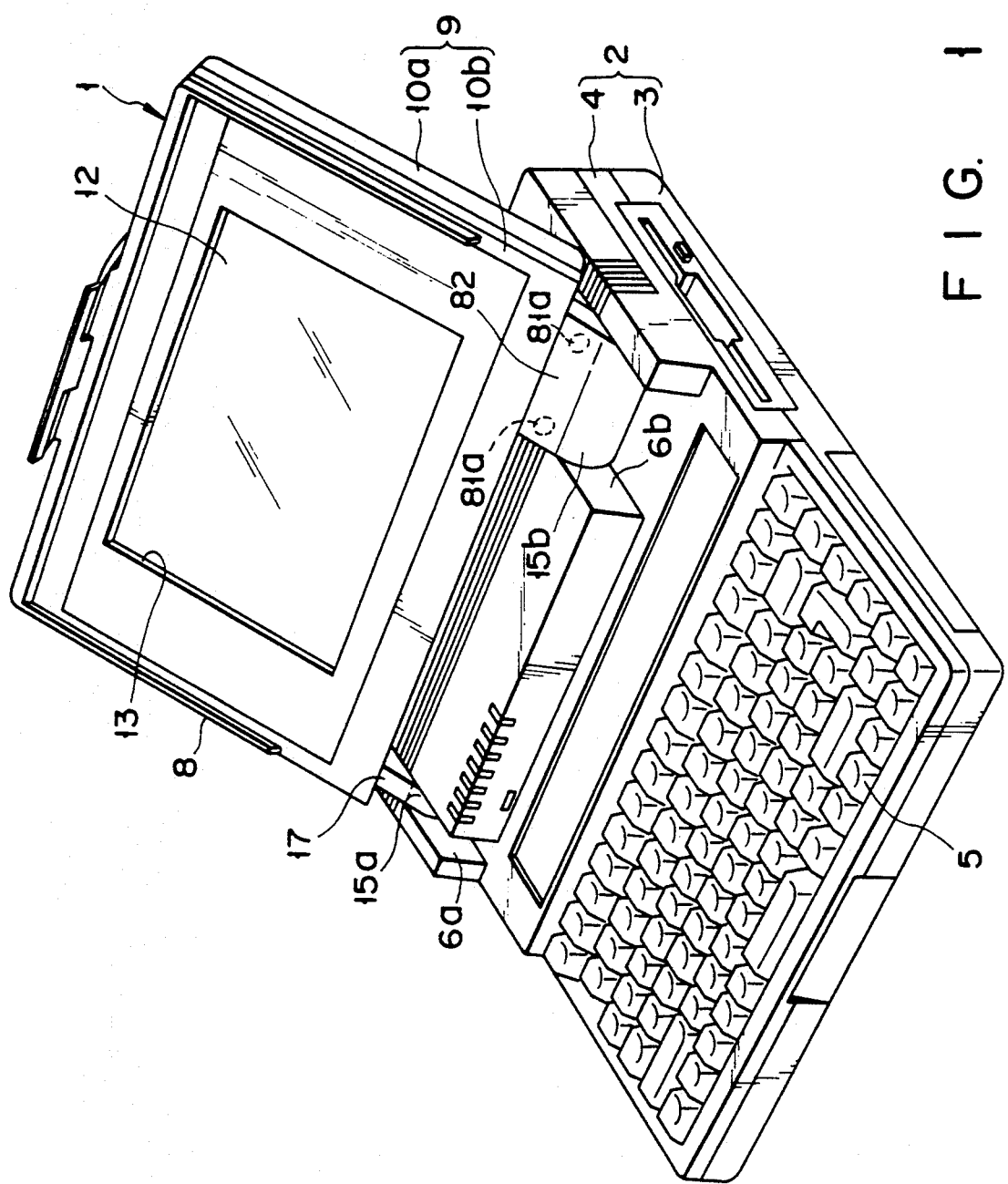
FIG. 1 is a perspective view illustrating a personal computer having a hinge device according to the present invention.
Figure 7:
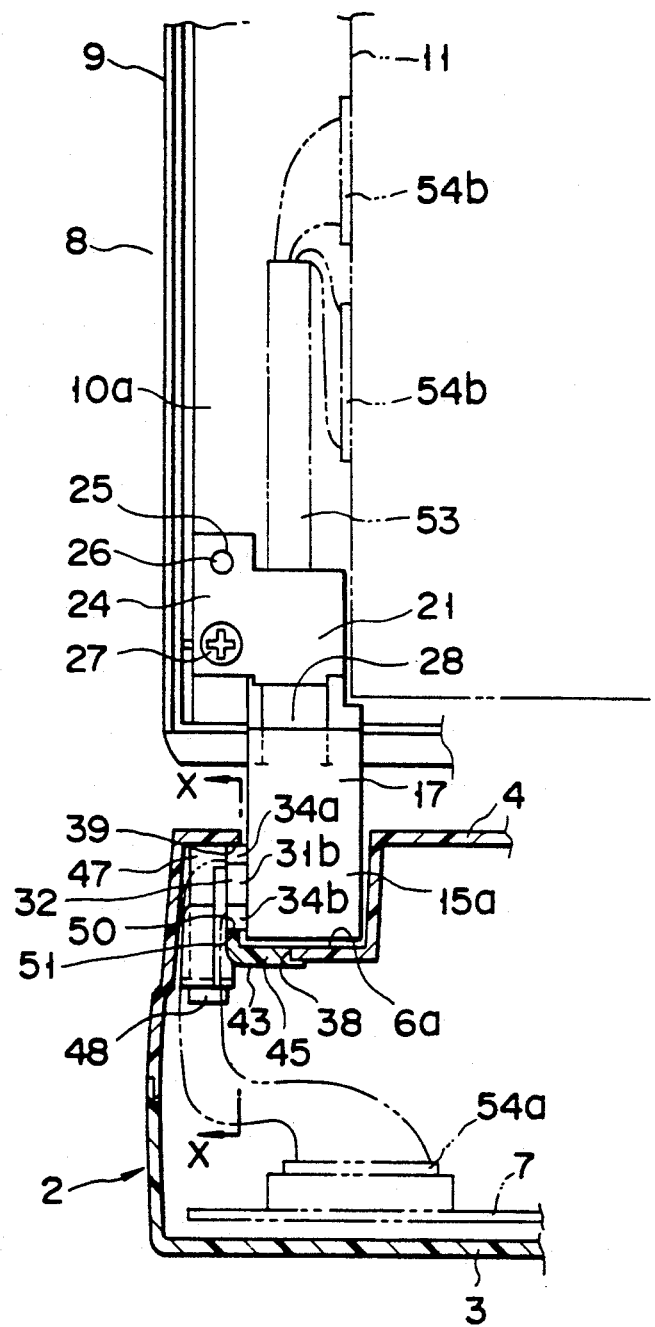
FIG. 7 is a sectional view schematically showing how the the housing and display unit of the personal computer are coupled to each other.

FIG. 1 illustrates a lap-top or portable personal computer 1. The computer 1 has a case 2 made of a synthetic resin and is shaped like a thin rectangular box comprising a bottom case 3 which is covered by a top cover 4. A keyboard 5 is attached to the front half of the top cover 4. The rearmost part of the half of the top cover 4 is thicker than the front most part of the rear half. Two recesses 6a and 6b are formed in the front-left and -right portions of the rear half of the top cover 4, respectively. As is shown in FIG. 7, a printed circuit board 7, on which are mounted a number of circuit parts (not shown), is incorporated in the case 2.

As is illustrated in FIG. 1, the computer 1 further comprises a flat-panel type display unit 8 located at the rear of the keyboard 5. The display unit 8 comprises a rectangular housing 9 and a flat liquid-crystal display 11 located within the housing 9. The housing 9 is composed of a base panel 10a and a front panel 10b, both shaped like a rectangular plate. These panels 10a and 10b are fastened together, by means of screws (not shown) at their four corners. The liquid-crystal display 11, which has a screen 12, is inter posed between the panels 10a and 10b. The screen 12 is exposed through the rectangular opening 13 made in the front panel 10b.

As is evident from FIG. 1, the display unit 8 is attached to the case 2 such that it rotate between a position (hereinafter referred to as "closed position") where it covers the keyboard 6 and a position (herein after referred to as "opened position") where it stands upright at the rear of the keyboard 5. The display unit 8 covers the entire keyboard 5 when it is rotated to the closed position. As long as the unit 8 remains in the closed position, its top is at the same level as the upper surface of the top cover 4, and its left and right sides are level with those of the top cover 4. In this condition, the case 2 and the display unit 8 form a relatively thin box which is quite portable.

Figure 2:
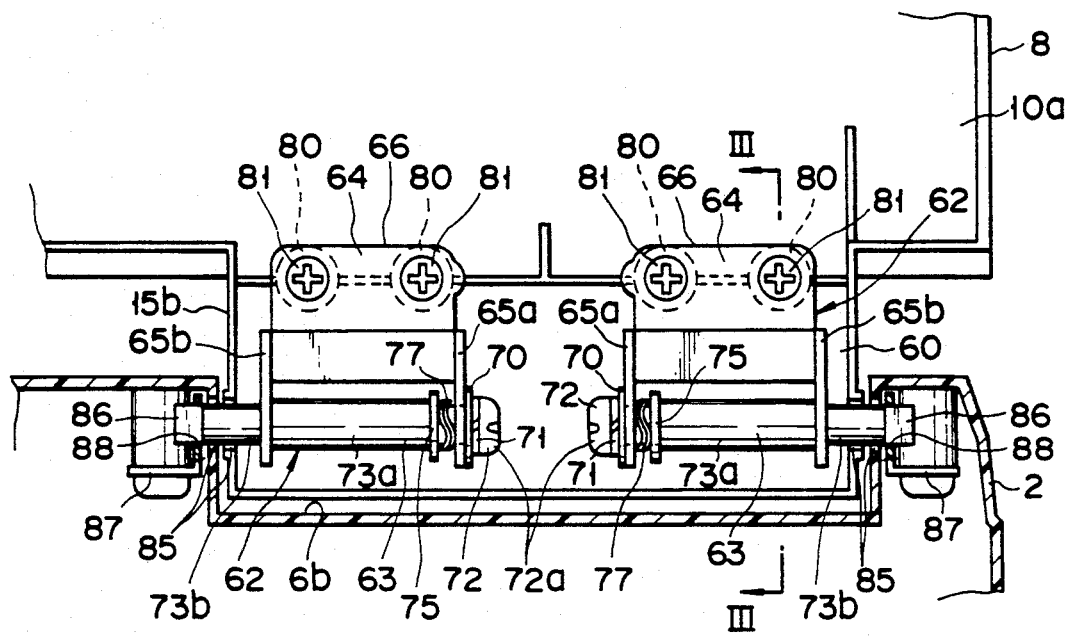
FIG. 2 is a sectional view schematically showing a hinge device according to a first embodiment of the present invention.
Figure 6:
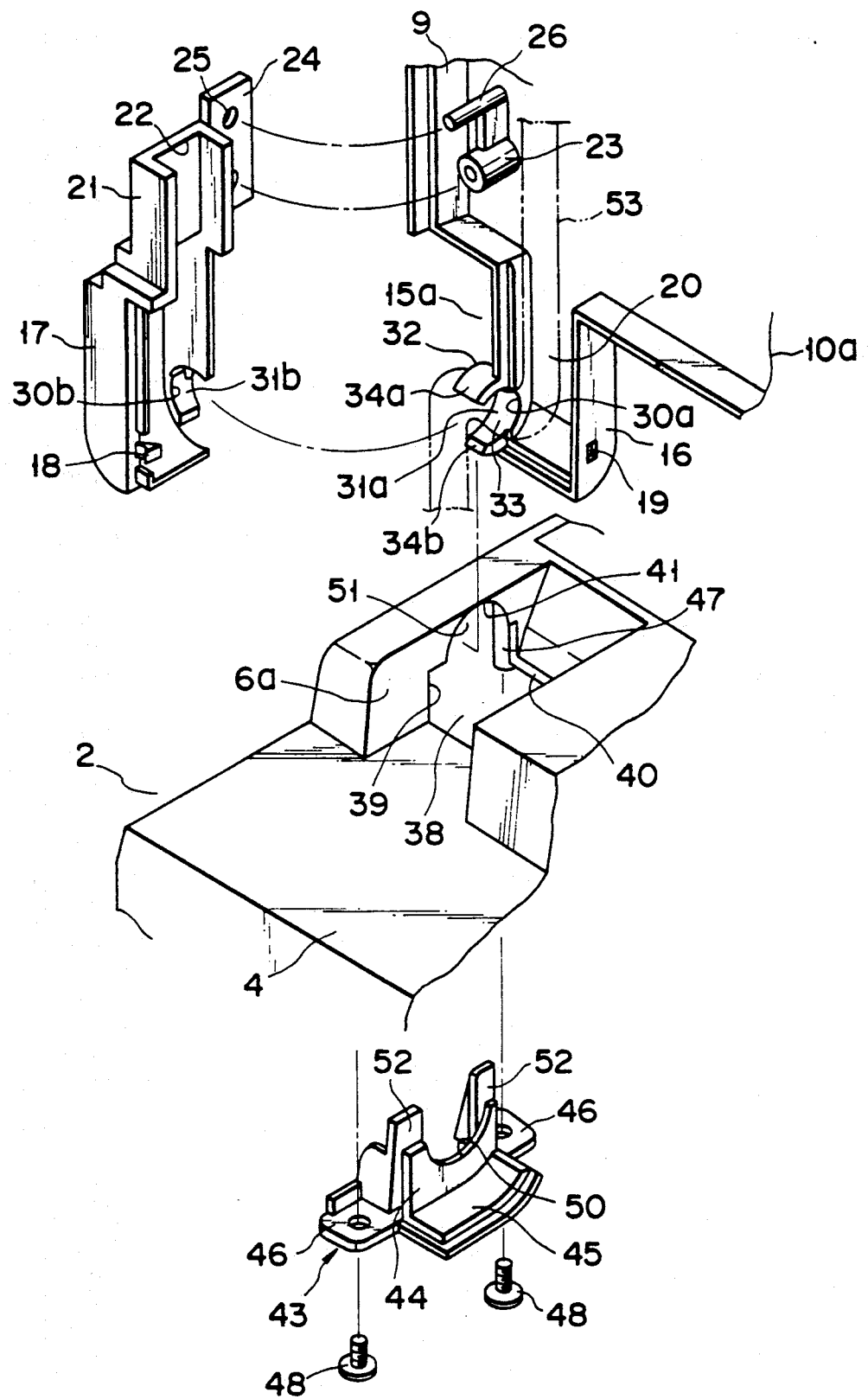
FIG. 6 consists of a perspective view showing a part of the case of the computer and an exploded view showing hinge mechanism for connecting a display unit to the case.

As is shown in FIGS. 2 and 6, a pair of leg sections 15a and 15b protrude from the lower-left and lower-right portions of the housing 9, with their lower ends located in the recesses 6a and 6b of the case 2. The leg section 15a and 15b will henceforth be described in detail.

As is evident from FIG. 6, the leg section 15a is formed of a rear leg segment 16 protruding from the base panel 10a and being integral therewith, and a front leg segment 17 removably fastened to the front of the rear leg segment 16. As FIG. 6 clearly shows, the front leg segment 17 has a claw 18 projecting from the side which connects to the rear leg segment 16. The claw 18 is positioned so that it engages the lock hole 19 formed in the inner side of the rear leg segment 16, with respect to the display unit 8, whereby the segments 16 and 17 are fastened together, forming the leg section 15a. The leg segments 16 and 17, thus fastened together, define a guide path 20.

The front leg segment 17 also has a guide portion 21 for guiding a cable into the housing 9. The guide portion 21 has a communication port 22 at its tip. The port 22 opens to the interior of the housing 9, thus allowing the guide path 20 to communicate with the interior of the housing 9. The segment 17 further has a fixing tongue piece 24 which is attached to the guide portion 21 and aligns with the boss 23 protruding from the base panel 10a, and has a positioning hole 25. A positioning projection 26, protruding from the base panel 10a, is inserted in the hole 25, thereby aligning the front leg segment 17 with respect to the rear leg segment 16. As a result of this, the leg segments 16 and 17 are firmly connected by means of a screw 27 set in screw 27 engagement with the boss 23, thus forming the leg section 15a.

Figure 8:
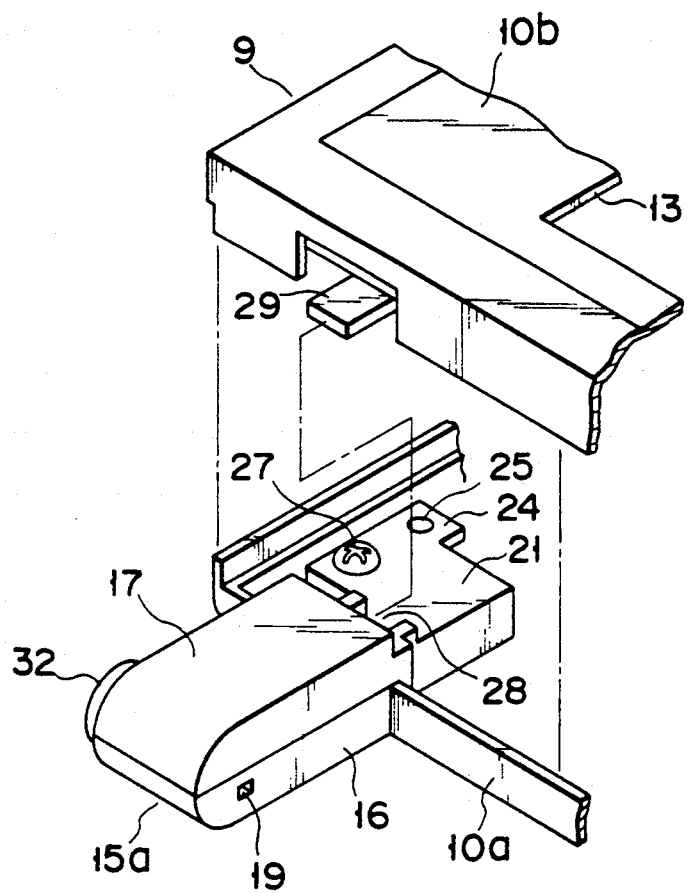
FIG. 8 is an exploded view showing the leg section which supports the display unit.
Figure 9:
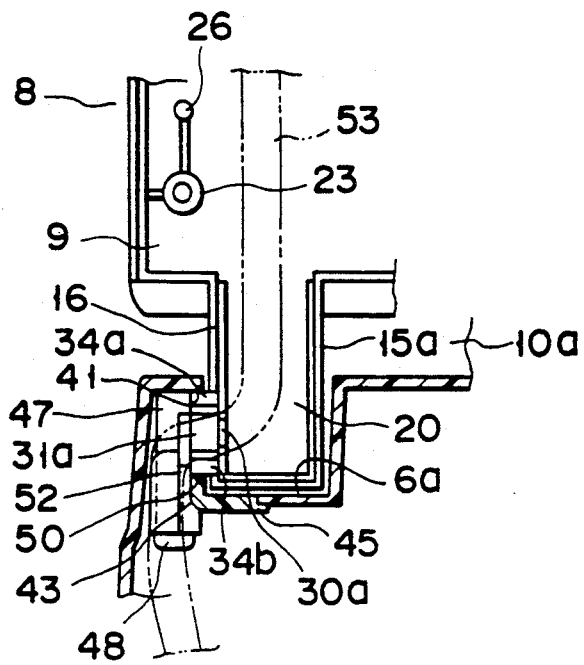
FIG. 9 is another sectional view, explaining how the cable is guided from the housing into the display unit through the hinge device shown in FIGS. 6 and 7.
Figure 10:
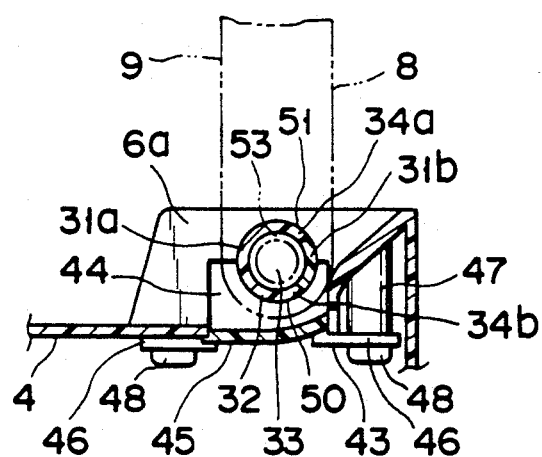
FIG. 10 is a sectional view, taken along line X—X in FIG. 7.
Figure 11:
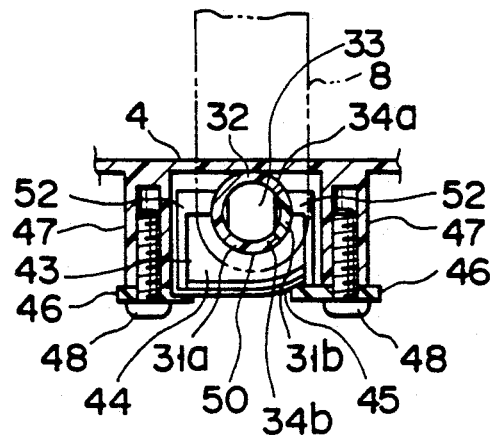
FIG. 11 is a sectional view showing the shaft and other components of the hinge device shown in FIGS. 6 and 7.

As is illustrated in FIG. 8, the stepped portion of the front leg segment 17, which is continuous to the guide portion 21, has a hole 28 opening into the interior of the leg segment 17. A tongue piece 29. protruding from the front panel 10b, is inserted in the hole 28, thus positioning the front panel 10b with respect to the base panel 10a.

As may be understood from FIG. 6, the leg segments 16 and 17 have, respectively half-cylinders 31a and 31b, which are situated on the outer sides and connected to each other. The half-cylinders 31a and 31b define U-shaped notches 30a and 30b. These half-cylinders 31a and 31b form a hollow shaft 32 having a guide path 33. The guide path 33 communicates with the guide path 20 defined by the leg segments 16 and 17.

Figure 12:
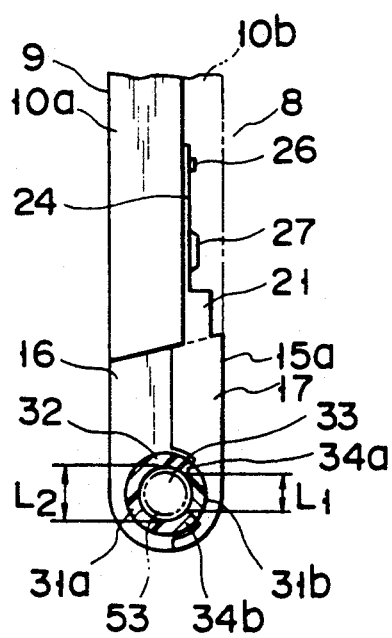
FIG. 12 is a partially sectional, side view of the display unit.

As is best shown in FIG. 6, the half-cylinder 31a of the rear leg segment 16 has two arcuate projections 34a and 34b opposing each other and extending into the front leg segment 17. Thus, as is illustrated in FIG. 12, the distance L1 between the tips of the arcuate projections 34a and 34b is shorter than the inside diameter L2 of the hollow shaft 32.

The leg section 15a of the housing 9 extends into the recess 6a of the case 2. As is evident from FIG. 6, an opening 38 is formed in the recess 6a. This opening 38 consists of two sections 39 and 40. The section 39 is cut in the outermost of the two opposing side walls which define the inner and outer faces of the recess 6a with respect to the case 2, and the section 40 is made in the face which defines the bottom of the recess 6a. The upper edge of the section 39, or receiving section 41, is arcuate, so that the shaft 32 is rotatably fitted in the opening 38.

A support 43, which is made of a synthetic resin, is located in the opening 38, extending from below the top cover 4. The support 43 is fastened to the wall defining the bottom of the recess 6a, and consists of a side wall 44 and a bottom 45 which are fitted in the sections 39 and 40 of the opening 38, respectively, and two flanges 46, connected to the front and rear edges of the section 39, and fastened to the bosses 47 which protrude downward from the inner surface of the top cover 4, by means of screws 48.

An arcuate notch 50, into which the shaft 32 is rotatably fitted, is cut in the upper edge of the side wall 44, so as to oppose the receiving section 41 in the case 2, and this notch 50 and the section 41 form a circular hole 51, through which the shaft 32 rotatably extends. A guide wall 52, which is taller than the side wall 44 and also has an arcuate notch, is formed integral with the wall 44.

The hole 51 communicates with the guide path 20 formed in the leg section 15a through the guide path 33 formed in the shaft 32. Hence, the guide paths 20 and 33 and the hole 51 connects the interior of the case 2 to that of the housing 9, and a cable 53 extends through the paths 20 and 33 and the hole 51, thus electrically connecting the printed circuit board 7 to the liquid-crystal display 11. The cable 53 is flexible, and has connectors 54a and 54b attached to its ends, as is shown in FIG. 7. The connectors 54a and 54b are elongated members than the hole 51. The connector 54a extends into the case 2 and is connected to the printed circuit board 7, and the connector 54b extends into the housing 9 and is connected to the liquid-crystal display 11.

It will now be explained how the cable 53 is guided from the case 2 into the housing 9 of the display unit 8, with display unit 8 disconnected from case 2.

First, the front panel 10b and the front leg segment 17 are removed from the base panel 10a of the housing 9. Also, the top cover 4 is detached from the bottom case 3. Further, the support 43 is removed from the top cover 4, thus allowing access to the interior of the case 2 through the opening 38 which is, as is shown in FIG. 6, formed in the left of the two opposing side walls which define the left and right faces of the recess 6a, and the the wall which define the bottom of the recess 6a. The opening 38 is larger than the connector 54a to be attached to the printed circuit board 7. That end portion of the cable 53 to which the connector 54a is connected is inserted into the case 2 through the opening 38.

Next, the support 43 is fitted into the opening 38 from within the top cover 4, with the cable 53 rested in the U-notch 50 of the support 42. The flanges 46 of the support 43 are then fastened to the bosses 47 by screws 48. As a result, the support 43 is secured to the housing 9, whereby the U-notch 50 of the support 43 and the receiving section 41 of the top cover 4 define the hole 51, and the cable 53 passes through this hole 51.

Then, the cable 53 is pushed into the half-cylinder 31a of the rear leg segment 16, more precisely into the gap between the arcuate projections 34a and 34b. Once the cable 53 is thus pushed into the half-cylinder 31a, it can hardly slip out of it since the distance L2 between the tips of the arcuate projections 34a and 34b is shorter than the inside diameter L1 of the hollow shaft 32. The rear leg segment 16 is inserted into the recess 6a, thus fitting cylinder 31a into the hole 51.

Thereafter, the cable 53 is guided through the rear leg segment 16 to a position above the base panel 10a. This done, the front leg section 17 is fastened to the rear leg section 16 by means of the screw 27, thus fitting the half-cylinder 31b into the hole 51. The half-cylinders 31a and 31b form the hollow shaft 32 having the guide path 33, through which the cable 53 extends into the housing 9 of the display unit 8. Thus, the cable 53 is guided from the case 2 into the housing 9 through the leg section 15a.

Figure 3:
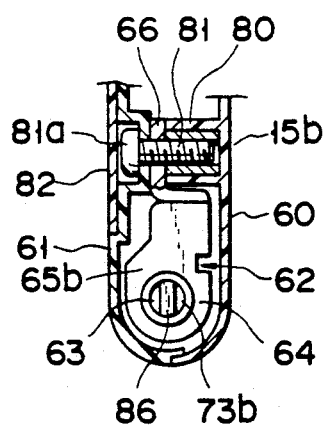
FIG. 3 is a sectional view, taken along line III—III in FIG. 2.
Figure 4:
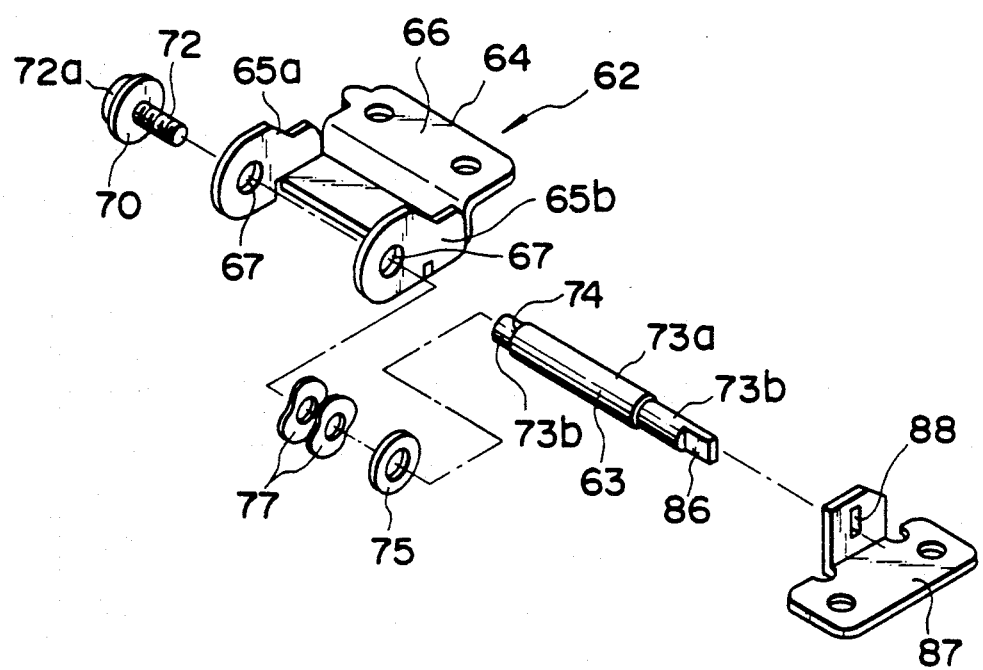
FIG. 4 is an exploded view illustrating the hinge device shown in FIG. 2.

As is illustrated in FIGS. 2 and 3, the leg section 15b of the housing 9 is composed of a rear leg segment 60 formed so as to be integral with the base panel 10a and a front leg segment 61 formed so as to be integral with the front panel 10b, and is similar to the leg section 15a in structure. The leg section 15b extends horizontally longer than the leg section 15a, and contains a pair of hinge mechanisms 62, which support the housing 9 such that it can be rotated upward from the other case 2 and downward thereto.

The first and second hinge mechanisms are located in the inner and outer ends of the leg section 15b, respectively. The hinge mechanism 62 is designed not only to support the housing 9, but also to hold it at any position between the closed position and the opened position. The hinge mechanisms 62 are identical in structure, and only one of them will, therefore, be described in detail with reference to FIG. 5.

Figure 5:
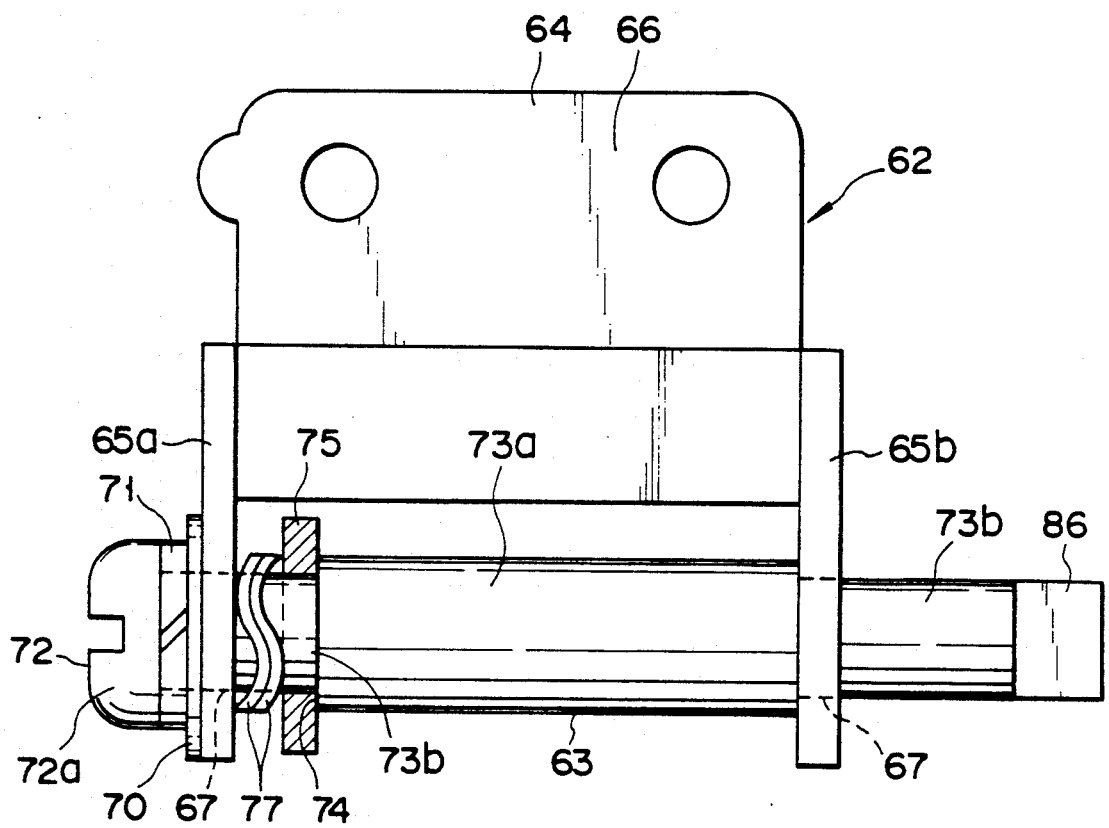
FIG. 5 is a plan view of the hinge device shown in FIG. 2.

As is illustrated in FIG. 5, either hinge mechanism 62 has a straight shaft 63 and a bracket 64 made of metal and supporting the shaft 63. The bracket 64 comprises a pair of support pieces 65a and 65b spaced apart in the axial direction of the shaft 63, and a fixing section 66 connecting these pieces 65a and 65b. The support pieces 65a and 65b each have a hole 67, and are so positioned that the holes 67 are coaxial. The ends of the shaft 63 are rotatably supported in these holes 67.

The left end of shaft 63 has a screw hole, and a screw 72 is inserted in this hole, with a plain washer 70 and a spring washer 71 interposed between it and the left end of the shaft 63. The plain washer 70, the spring washer 71, and the head 72a of the screw 72 have diameters larger than those of holes 67. Hence, the plain washer 70 abuts on the outer side of support piece 65a, whereby the washers 70 and 71 and the screw 72 prevent the shaft 63 from slipping from the hinge mechanism 62.

The shaft 63 consists of three portions, i.e., a thick portion 73a and two thin portions 73b extending from the ends of the portion 73a. The first thin portion 73b is inserted in the hole 67 of the support pieces 65b, and the second thin portion 73b is inserted in the hole 67 of the support piece 65a. A plain washer 75 having an outside diameter larger than the diameter of the thick portion 73a is mounted on the thin portion Two wave washers 77 having an outside diameter substantially the same as the diameter of the thick portion 73a are mounted on the thin portion 73b and compressed between the plain washer 75 and the support piece 65a of the bracket 64. The two wave washers 77, which function as springs, abut on the plain washer 75 and the support piece 65a, respectively. A friction force is thereby generated between the plain washer 75 and the bracket 64, restricting the rotation of the shaft 63 which is supported by the bracket 64.

In this embodiment, two wave washers 77 are used to restrict the rotation of the shaft 63. Alternatively, one wave washer, or three or more wave washers may be used for the same purpose in the present invention.

As is shown in FIG. 2, two pairs of bosses 80 protrude from the inner surface of the rear leg segment 60. The fixing sections 66 of the first and second hinge mechanisms 62 are fastened to the first and second pairs of bosses 80, respectively, by means of screws 81, whereby both hinge mechanisms 62 are coupled to the housing 9. As is shown in FIG. 3, one of the screws 81 which fasten either fixing section 66 to the bosses 80 passes through the hole cut in the front leg segment 61, and thus fastens the front leg segment 61 to the rear leg segment 60. A decoration cover 82 is removably connected to the front leg segment 61, thus concealing the heads 81a of the screws 81.

As is illustrated in FIG. 2, one of the thin portions 73b of either shaft 63 extends into case 2 through the hole 85 made in the side wall of case 2. That end 86 of the portion 73b which is located within the case 2 has a polygonal cross section. The end 86 of the thin portion 73b is fitted in the corresponding hole 88 made in the support 87 which protrudes downward from the top wall of case 2. Thus, the shaft 63 of the hinge mechanism 62 cannot rotate.

The display unit 8 has its leg section 15a connected to the case 2 by means of the shaft 32 held in the hole 51 as is shown in FIGS. 6 and 7, and has its leg section 15b connected to the case 2 by means of the hinge mechanisms 62 as is shown in FIGS. 2 and 3. The unit 8 is thus rotatably supported on the case 2.

It will now be explained how either hinge mechanisms 62 operate to hold the display unit 8 at any desired position between the closed position and the opened position.

When the display unit 8 is rotated from the closed position toward the opened position, the bracket 64 of the mechanism 62, which is fastened to the base panel 10a, rotates around the shaft 63, allowing the unit 8 to rotated to any position between the closed position and the opened position, so that the user of the personal computer can see clearly the data displayed on the liquid-crystal display screen 12.

Since the wave washers 77 are interposed and compressed between the plain washer 75 mounted on the shaft 63 and the support piece 65a of the bracket 64, a frictional force is generated between the bracket 64 and the plain washer 75. This force suppresses the rotation of the bracket 64, whereby the display unit 8 remains at the position where the user takes his or her hand off the display unit 8.

The two wave washers 77 can easily be incorporated in the hinge mechanism 62, when pushed into the gap between the support piece 65a and the plain washer 75. Once so incorporated, the washers 77 can exert a frictional force between the shaft 63 and the bracket 64. Unlike the coil spring used in the conventional hinge described above, the wave washers 77 need not be machined with high precision, or positioned in the hinge mechanism 62 with high precision. Therefore, the hinge mechanism 62 can be manufactured at lower cost than the conventional hinge.

Further, since the total thickness of the two wave washers 77 is far less than the length of the coil spring wound around the hinge shaft in the conventional hinge, the hinge mechanism 62 is much shorter than the conventional hinge.

Figure 13:
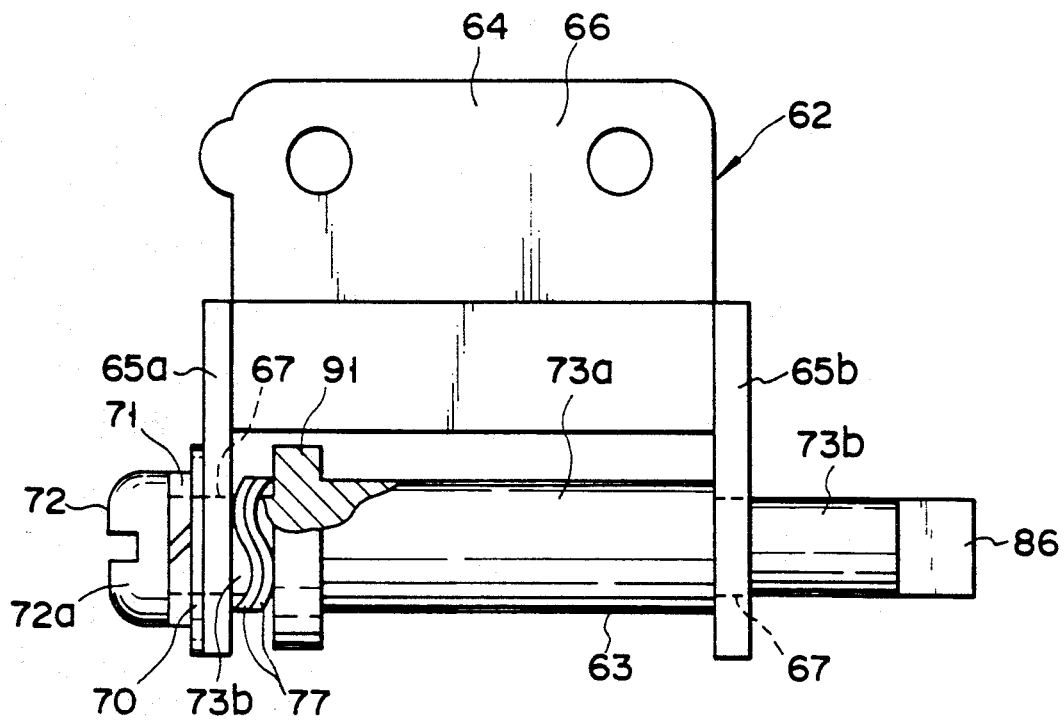
FIG. 13 is a plan view showing a hinge device according to a second embodiment of the invention.

FIG. 13 illustrates a hinge mechanism according to a second embodiment of the invention. This mechanism is different from the first embodiment (FIG. 5), in that a flange 91 is formed integral with the shaft 63, located between the thick portion 73a and the thin portion 73b, and has a larger diameter than the thick portion 73a. Two wave washers 77 are mounted on the thin portion 73b and compressed between the flange 91 and the support piece 65a of the bracket 64.

Figure 14:
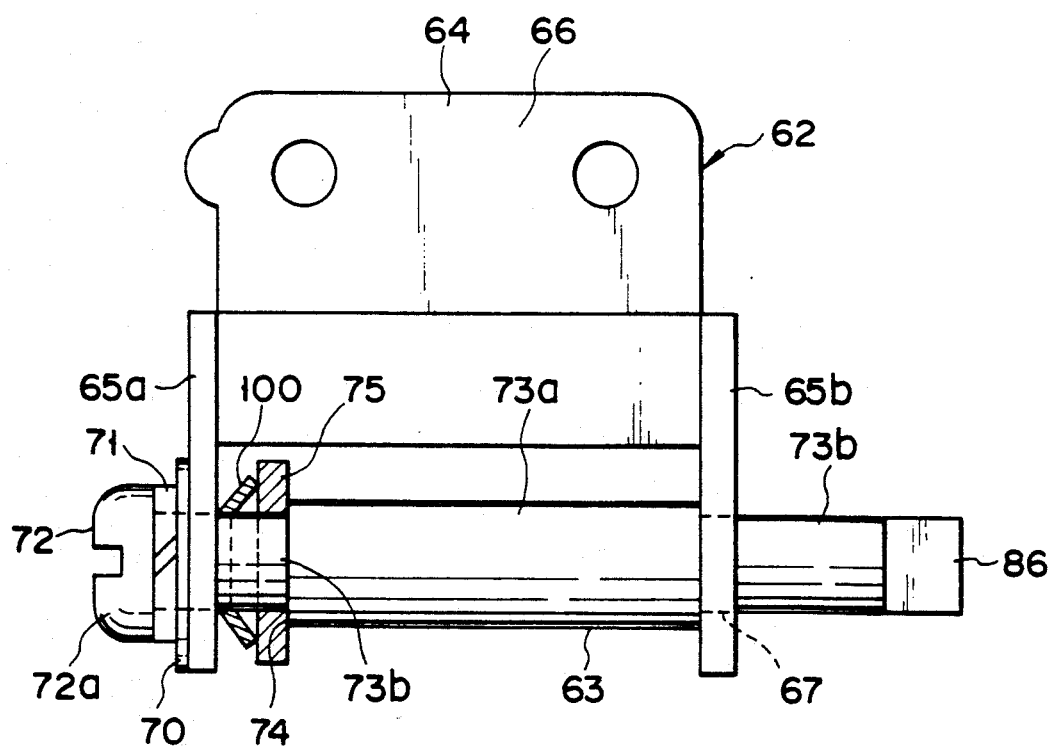
FIG. 14 is a plan view illustrating a hinge device according to a third embodiment of the invention.

FIG. 14 shows a hinge mechanism according to a third embodiment of the invention, which is identical to the first embodiment (FIG. 5), except that a bellevill spring 100 is used in place of wave washers.

The hinge device according to the invention can be used, not only in personal computer, but also in word processors, reclining seats, and the like.

Additional advantages and modifications will readily occur to those skilled in the art. Therefore, the invention in its broader aspects is not limited to the specific details, shown and described herein. Accordingly, various modifications may be made without departing from the spirit or scope of the general inventive concept as defined by the appended claims and their equivalents.

What is claimed is:

1. A hinge device for rotatably connecting first and second sections of an apparatus, the hinge device comprising:
   a shaft comprising:
      first and second ends, the first end being connected to the first section; and
      first and second portions, the first portion having a diameter greater than a diameter of the second portion, the first portion cooperating with the second portion to form an edge;
   means, connected to the second section, for supporting the second section, the supporting means being rotatably connected to the second portion of the shaft; and
   ring-shaped spring means, compressed between the edge and the supporting means, for generating friction between the first edge and the supporting means to suppress rotation of the supporting means around the shaft when the supporting means is rotatably moved.

2. The hinge device according to claim 1, wherein the ring-shaped spring means comprises at least one wave washer.

3. The hinge device according to claim 1, wherein the ring-shaped spring means comprises a plurality of wave washers stacked, one upon another, in an axial direction of said shaft.

4. The hinge device according to claim 1, wherein the ring-shaped spring means comprises a plurality of wave washers stacked, one upon another, in an axial direction of said shaft.

5. The hinge device according to claim 1, wherein the supporting means includes a bracket fastened to the second section.

6. A hinge device as in claim 5, wherein the bracket comprises:
   a first support piece rotatably disposed on the shaft;
   a second support piece rotatably disposed on the shaft at a predetermined distance away from the first support piece; and
   means for connecting the first and second support pieces and for removably connecting to the second section.

7. The hinge device according to claim 6 wherein each of the first and second support pieces has a through hole, the shaft being rotatably inserted in the through holes of said support pieces.

8. A hinge device as in claim 7, further comprising a screw, connected to the second end of the shaft, for rotatably securing the shaft to the first support piece and for maintaining a predetermined distance between the first support piece and the edge, a head of the screw being larger than a diameter of the through hole of the first support piece.

9. A hinge device as in claim 1 further comprising a plain washer having an outer diameter larger than the diameter of the first portion, the plain washer being disposed between the edge and the ring-shaped spring means.

10. A hinge device as in claim 1, wherein the first portion of the shaft comprises a flange portion at the edge, the flange portion having an outer diameter larger than the diamter of the first portion.

11. A hinge device for rotatably connecting a first and second section of an apparatus, the hinge device comprising:
    a shaft comprising:
       first and second ends, the first end being connected to the first section; and
       first and second portions, the first portion having a diameter greater than a diameter of the second portion, the first portion cooperating with the second portion to form an edge;
    a bracket rotatably connected to the second portion of the shaft, the bracket supporting and being connected to the second section thereby enabling the second section to be movably rotated around the shaft; and
    spring means, compressed and disposed between the edge and the bracket, for generating friction between the edge and the bracket to suppress the rotation of the bracket when the bracket is rotatably moved around the shaft.

12. A portable computer comprising:
    a base unit including a keyboard and a shaft supporter;
    a display unit rotatably connected to the base unit, the display unit having a bracket connecting section, the display unit being rotatable between a first position for covering the keyboard and a second position for operating the computer;
a shaft comprising:
   first and second ends, the first end being connected to the shaft supporter; and
   first and second portions, the first portion having a diameter greater than a diameter of the second portion, the first portion cooperating with the second portion to form an edge;
a bracket removably attached to the bracket connecting section and being rotatably connected to the second portion;

spring means, compressed and disposed between the edge and the bracket, for generating friction between the bracket and the edge to suppress rotation of the display unit when the display unit is rotated between the first position and the second position.

13. A portable computer as in claim 12, further comprises means, removably connected to the second end of the shaft, for maintaining a predetermined distance between the bracket and the edge.

14. a portable computer as in claim 12, wherein the maintaining means comprises a screw removably connected to the second end of the shaft.

* * * * *